United States Patent [19]
Gibson et al.

[11] Patent Number: 5,557,596
[45] Date of Patent: Sep. 17, 1996

[54] ULTRA-HIGH DENSITY STORAGE DEVICE

[76] Inventors: Gary Gibson, 123 Seale Ave., Palo Alto, Calif. 94301; Theodore I. Kamins, 4132 Thain Way, Palo Alto, Calif. 94306; Marvin S. Keshner, 321 Easy St. #2, Mountain View, Calif. 94043; Steven L. Neberhuis, 35923 Blair Pl., Fremont, Calif. 94536; Craig M. Perlov, 1815 Chula Vista Dr., Belmont, Calif. 94002; Chung C. Yang, 19550 Braemer Ct., Saratoga, Calif. 95070

[21] Appl. No.: 501,432

[22] Filed: Jul. 12, 1995

Related U.S. Application Data

[63] Continuation-in-part of Ser. No. 406,628, Mar. 20, 1995, abandoned.

[51] Int. Cl.$^6$ .............................. G11B 7/00; G11C 11/42
[52] U.S. Cl. ..................... 369/101; 369/100; 365/151; 365/118; 365/128
[58] Field of Search .................... 365/118, 217, 365/218, 237, 151; 369/101; 250/310

[56] References Cited

U.S. PATENT DOCUMENTS

| | | | |
|---|---|---|---|
| 4,427,886 | 1/1984 | Martin et al. | 250/310 |
| 4,534,016 | 8/1985 | Kirkpatrick et al. | 365/128 |
| 4,600,839 | 7/1986 | Ichihashi et al. | 250/310 |
| 4,760,567 | 7/1988 | Crewe | 369/101 |
| 5,402,410 | 3/1995 | Yoshimura et al. | 365/118 |

OTHER PUBLICATIONS

R. T. Howe, et al., "Silicon micromechanics: sensors and actuators on a chip", IEEE Spectrum, Jul. 1990, pp. 35.

E. Huber and E. E. Marinero, "Laser–Induced Crystallization of Amorphous GeTe: A time–resolved study", Physics Review B, Jul. 15, 1987–II, vol. 36, No. 3, pp. 1595–1604.

B. G. Yacobi, "Electron–beam–induced information storage in hydrogenated amorphous silicon device", Journal of Applied Physics Letters, vol. 44(7), Apr. 1984, pp. 695–697.

Gary W. Jones, "Silicon Field Emission Transistors and Diodes," IEEE Trans. Components, Hydbrids and Manufacturing Technology, V. 15, 1992, pp. 1051–1055.

C. A. Spindt., et al., "Physical Properties of Thin–Film Field Emission Cathodes with Molybdenum Cones", Journal of Applied Physics, vol. 47, No. 12, Dec. 1976, pp. 5248–5263.

V. P. Jaecklin, et al., "Novel Polysilicon Comb Actuators for X–Y Stages", Proceedings of MicroElectro Mechanical systems, 1992, pp. 147–149.

*Primary Examiner*—Viet Q. Nguyen

[57] ABSTRACT

A storage device including many field emitters in close proximity to a storage medium, and a micromover, all in a partial vacuum. Each field emitter can generate an electron beam current. The storage medium has many storage areas on it, with each field emitter responsible for a number of storage areas. Also, each storage area can be in a number of different states to represent the information stored in that area. In storing information to the storage device, the power density of an electron beam current is increased to change the state of the storage area bombarded by the electron beam current. In reading information from the device, the power density of the electron beam current is reduced to generate a signal current from the storage area bombarded by the electron beam current. During reading, the power density is selected to be low enough so that no writing occurs. The magnitude of the signal current depends on the states of the storage area. The information stored in the storage area is read by measuring the magnitudes of the signal current. Finally, the micromover can scan the storage medium with respect to the field emitters so that each field emitter can access many storage areas.

25 Claims, 6 Drawing Sheets

SECTION A-A

ULTRA-HIGH DENSITY STORAGE DEVICE

CROSS REFERENCE TO RELATED APPLICATIONS

This is a continuation-in-part of application Ser. No. 08/406,628, filed on Mar. 20, 1995, now abandoned.

BACKGROUND OF THE INVENTION

The present invention relates generally to storage devices, and more particularly to storage devices based on field emitters.

For decades, researchers have been trying to increase the storage density and reduce the cost/storage in information storage devices, such as magnetic hard-drives, optical drives, and DRAM. However, it has become increasingly difficult to squeeze more information into the storage devices. Moreover, conventional technologies to make those devices may be approaching fundamental limits on storage density.

Many scientists have proposed alternative approaches to increase the storage density. One approach is based on Scanned Probe Microscopy (SPM) technologies. Typically, in such an approach, a probe is positioned extremely close to a storage medium. For example, in one implementation of Atomic Force Microscopy, the probe physically touches the medium; in Scanning Tunnelling Microscopy (STM), the probe is within a few nanometers of the medium to ensure that the probe is within the tunnelling range of the medium. It is difficult to inexpensively build a storage system with a probe in contact with or in such extremely close proximity to the medium without, eventually, damaging or effacing the surface of the medium or the probe. Moreover, in STM, the nanometer spacing must be precisely controlled. This is a difficult task.

Some researchers have found methods to eliminate the need for such extremely close proximity. One technique is based on Near-Field Scanning Optical Microscopy. However, this technique has limited lateral resolution and bandwidth. Other techniques are based on non-contact Scanning Force Microscopy, which typically suffers from poor resolution and poor signal to noise ratio.

Even if one has increased the storage density, one still has to overcome another major hurdle, which is the time required to access the information. The storage device's utility is limited if it takes a long time to retrieve the stored information. In other words, in addition to high storage density, one must find a way to quickly access the information.

It should be apparent from the foregoing that there is still a need for a storage device that is based on a non-conventional approach, with significantly increased storage density, and low cost/storage. Moreover, the storage device preferably should have fast access times and high data rates.

SUMMARY OF THE INVENTION

The present invention is a ultra-high density storage device. In addition, the present invention has fast access times and high data rates.

The invented storage device is based on a technology different from any of the conventional storage devices. It is based on field emitters, which are made by standard semiconductor microfabrication technology, and which emit beams of electrons from very sharp points.

In one preferred embodiment of the invention, the storage device includes many field emitters, a storage medium and a micromover. The storage medium has many storage areas, and the field emitters are spaced apart to have one emitter responsible for a number of storage areas on the storage medium. In one preferred embodiment, each storage area is responsible for one bit of the storage device. The medium is in close proximity to the field emitters, such as a few hundredths of a micrometer to a few micrometers away.

Each field emitter generates an electron beam current. Each storage area can be in one of a few different states. In one embodiment, binary information is stored in the areas, with one state representing a high bit and another state representing a low bit.

When an electron beam current bombards a storage area, a signal current is generated. The magnitude of the signal current depends on the state of that storage area. Thus, the information stored in the area can be read by measuring the magnitude of the signal current.

Information can be written onto the storage areas using the electron beams. The magnitude of each electron beam can be increased to a preselected level to change the state of the storage area on which it impinges. By changing the state of a storage area, one writes information onto it.

Just like the field emitters, the micromover is made by semiconductor microfabrication techniques. The micromover scans the storage medium with respect to the field emitters or vice versa. Thus, each emitter can access information from a number of storage areas on the medium.

With hundreds or thousands of field emitters reading and/or writing information in parallel, the storage device has very fast access times and data rates.

Other aspects and advantages of the present invention will become apparent from the following detailed description, which, when taken in conjunction with the accompanying drawings, illustrates by way of example the principles of the invention.

Same numerals in FIGS. 1–5 are assigned to similar elements in all the figures. Embodiments of the invention are discussed below with reference to FIGS. 1–5. However, those skilled in the art will readily appreciate that the detailed description given herein with respect to these figures is for explanatory purposes as the invention extends beyond these limited embodiments.

DETAILED DESCRIPTION OF THE INVENTION

Figure 1A:
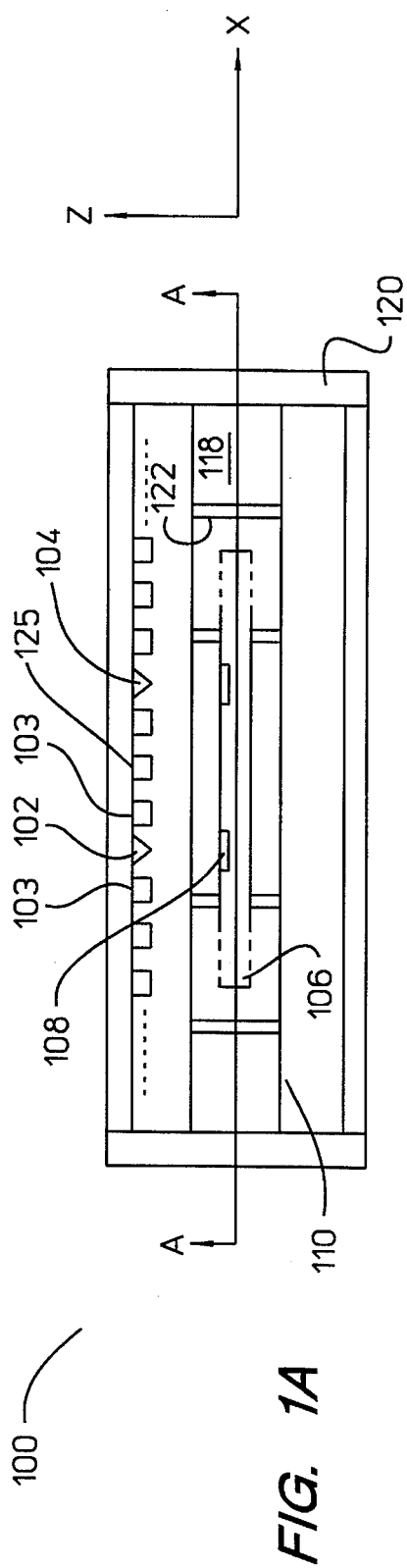
FIGS. 1A–1B show different perspectives of a preferred embodiment of the invention.

FIG. 1A shows a side cross section view of a preferred embodiment 100 of the invention. It includes a number of field emitters, such as 102 and 104, a storage medium 106 with a number of storage areas, such as 108, and a micromover 110, which scans the storage medium 106 with respect to the field emitters or vice versa. In one preferred embodiment, each storage area is responsible for storing one bit of information.

In the preferred embodiment, the field emitters are point-emitters with very sharp points; each may have a radius of curvature of about one nanometer to hundreds of nanometers. During operation, a preselected potential difference is applied between a field emitter and its corresponding gate, such as between the emitter 102 and its circular gate 103 surrounding it. Due to the sharp point of the emitter, an electron beam current is extracted from the emitter towards the storage area. Depending on the distance between the emitters and the storage medium 106, the type of emitters, and the spot size (bit size) required, one might need electron optics to focus the electron beams. A voltage may also be applied to the storage medium 106 to either accelerate or decelerate the field-emitted electrons or to aid in focusing the field-emitted electrons.

In the preferred embodiment, the casing 120 keeps the storage medium 106 in partial vacuum, such as at least $10^{-5}$ torr. Different researchers have fabricated such types of microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

In the embodiment shown in FIG. 1A, each field emitter has a corresponding storage area. In another embodiment, each field emitter is responsible for a number of storage areas. As the micromover 110 scans the medium 106 to different locations, each emitter is positioned above different storage areas. With the micromover 110, an array of field emitters can scan over the storage medium.

As will be described, the field emitters are responsible to read and write information on the storage areas by means of the electron beams they produce. Thus, the field emitters suitable for the present invention are the type that can produce electron beams that are narrow enough to achieve the desired bit density of the storage medium, and can provide the power density of the beam current needed for reading from and writing to the medium. A variety of ways are known in the art that are suitable to make such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4th Int. Vacuum Microelectronics Conf., Nagahama, Japan, page 26, 1991. Such emitters have been successfully applied to disciplines, such as flat panel displays. However, the present invention shows that it is highly advantageous to apply such emitters to the storage industry.

In one preferred embodiment, there can be a two-dimensional array of emitters, such as 100 by 100 emitters, with an emitter pitch of 50 micrometers in both the X and the Y directions. Each emitter may access bits in tens of thousands to hundreds of millions of storage areas. For example, the emitters scan over the storage medium that has a two dimensional array of storage areas, with a periodicity of about 1 to 100 nanometers between any two storage areas and the range of the micromover is 50 micrometers. Also, all the emitters may be addressed simultaneously or in a multiplexed manner. Such a parallel accessing scheme significantly reduces access time, and increases data rate of the storage device.

Figure 1C:
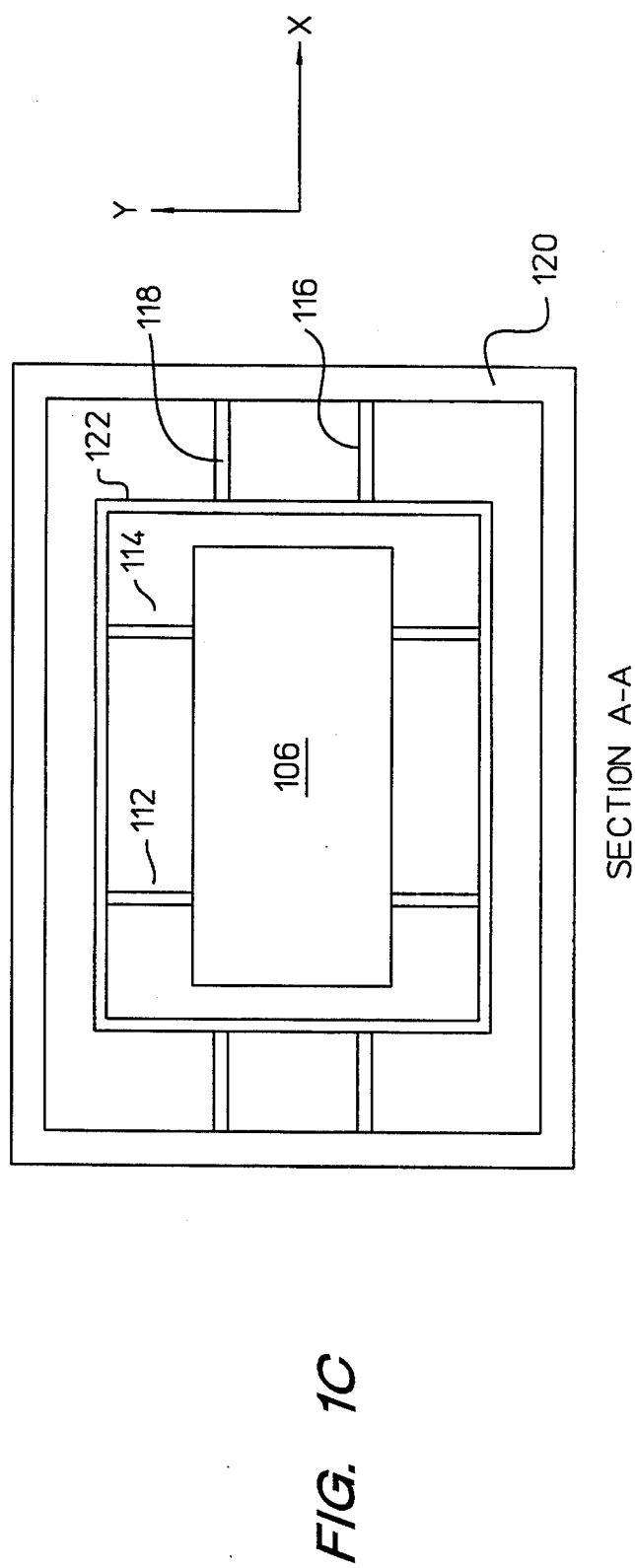
FIG. 1C shows the top view of the cross section A—A in FIG. 1A.
Figure 1B:
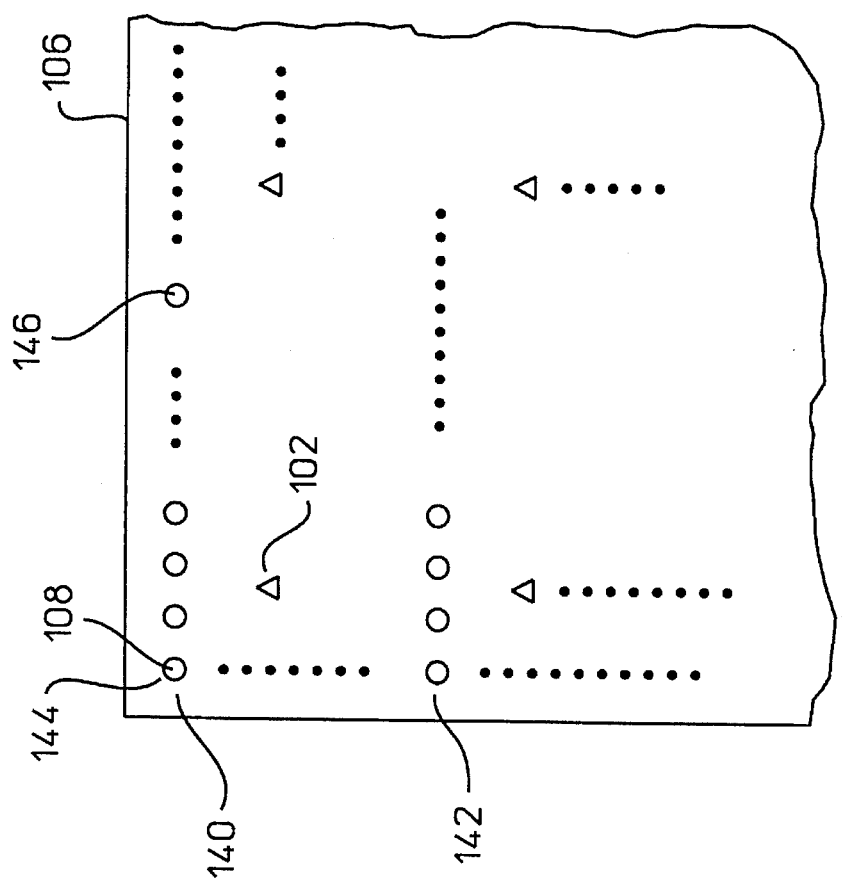

FIG. 1B shows the top view of the storage medium in a preferred embodiment illustrating a two dimensional array of storage areas and a two dimensional array of emitters. Addressing the storage areas requires external circuits. One preferred embodiment to reduce the number of external circuits is to separate the storage medium into rows, such as the row 140, where each row contains a number of storage areas. Each emitter is responsible for a number of rows. However, in this preferred embodiment, each emitter is not responsible for the entire length of the rows. For example, the emitter 102 is responsible for the storage areas within the rows 140 through 142, and within the columns 144 through 146. All rows of storage areas accessed by one emitter are connected to one external circuit, for example rows 140 through 142. To address a storage area, one activates the emitter responsible for that storage area and moves that emitter by the micromover to that storage area. One also has to activate the external circuit connected to the rows of storage areas within which that storage area lies.

The preferred micromover 110 can also be made in a variety of ways, as long as it has sufficient range and resolution to position the field emitters over the storage areas. As a conceptual example, the micromover 110 is fabricated by standard semiconductor microfabrication process to scan the medium 106 in the X and Y directions with respect to the casing 120. FIG. 1C shows the top view of the cross section A—A in FIG. 1A, illustrating the storage medium being held by two sets of thin-walled microfabricated beams. The faces of the first set of thin-walled beams are in the Y-Z plane, such as 112 and 114; this set of beams may be flexed in the X direction allowing the medium to move in the X direction with respect to the casing 120. The faces of the second set of thin-walled beams are in the X-Z plane, such as 116 and 118; this set of beams allow the medium to move in the Y direction with respect to the casing 120. The medium is held by the first set of beams, which are connected to a frame 122. The frame 122 is held by the second set of beams, which are connected to the casing 120. The field emitters scan over the medium, or the medium scans over the field emitters in the X-Y directions by electrostatic, electromagnetic or piezoelectric means known in the art. In this example, the micromover 110 includes the structure holding and moving the storage medium relative to the field emitters. A general discussion of such microfabricated micromover can be found, for example, in "Novel Polysilicon Comb Actuators for XY-Stages," published in the Proceeding of MicroElectro Mechanical Systems 1992, written by Jaecklin et al.; and in "Silicon Micromechanics: Sensors and Actuators on a Chip", by Howe et al., published in IEEE Spectrum, page 29, in July 1990.

In another preferred embodiment, the electron beam currents are rastered over the surface of the storage medium 106 by either electrostatically or electromagnetically deflecting them, such as by electrostatic deflectors like the electrode 125 positioned adjacent to the emitter 104. Many different approaches to deflect electron beams can be found in the literature on Scanning Electron Microscopy and will not be further described in this specification.

In one preferred method, writing is accomplished by temporarily increasing the power density of the electron beam current to modify the surface state of the storage area; and reading is accomplished by observing the effect of the storage area on the electron beams, or the effect of the electron beams on the storage area. Note that a storage area that has been modified can represent a bit 1, and a storage area that has not been modified can represent a bit 0. In fact, one can modify the storage area to different degrees to represent more than two bits. Different examples will be described in the following to show that some modifications are permanent, and some modifications are reversible. The permanently modified storage medium is suitable for write-once-read-many memory (WORM).

In one preferred embodiment, known in the present description as the preferred "SEM" approach, the basic idea is to alter the structure of the storage area in such a way as to vary its secondary electron emission coefficient (SEEC), its backscattered electron coefficient (BEC), or the collection efficiency for secondary or backscattered electrons emanating from this area. The SEEC is defined as the number of secondary electrons generated from the medium for each electron incident onto the surface of the medium. The BEC is defined as the fraction of the incident electrons that are scattered back from the medium. The collection efficiency for secondary/backscattered electrons is the fraction of the secondary/back-scattered electrons that is collected by an electron collector, typically registered in the form of a current.

Reading is typically accomplished by collecting the secondary and/or backscattered electrons when an electron beam with a lower power density is applied to the medium 106. During reading, the power density of the electron beam should be kept low enough so that no further writing occurs.

One preferred embodiment of the storage medium is a material whose structural state can be changed from crystalline to amorphous by electron beams. The amorphous state has a different SEEC and BEC than the crystalline state; this leads to a different number of secondary and backscattered electrons emitted from the storage area. By measuring the number of secondary and backscattered electrons, one can determine the state of the storage area. To change from the amorphous to crystalline state, one increases the beam power density and then slowly decreases it. This heats up the amorphous area and then slowly cools it so that the area has time to anneal into its crystalline state. To change from crystalline to amorphous state, one increases the beam power density to a high level and then rapidly decreases the beam power. To read from the storage medium, a lower-energy beam strikes the storage area. An example of such type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here.

There are many preferred ways to induce a state change in the medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure and crystallography can affect the coefficients. Also, the BEC depends on atomic number, Z. Thus, one preferred storage medium has a layer of low Z material on top of a layer of high Z material or vice versa, with writing accomplished through ablating some of the top layer by an electron beam.

Figure 2:
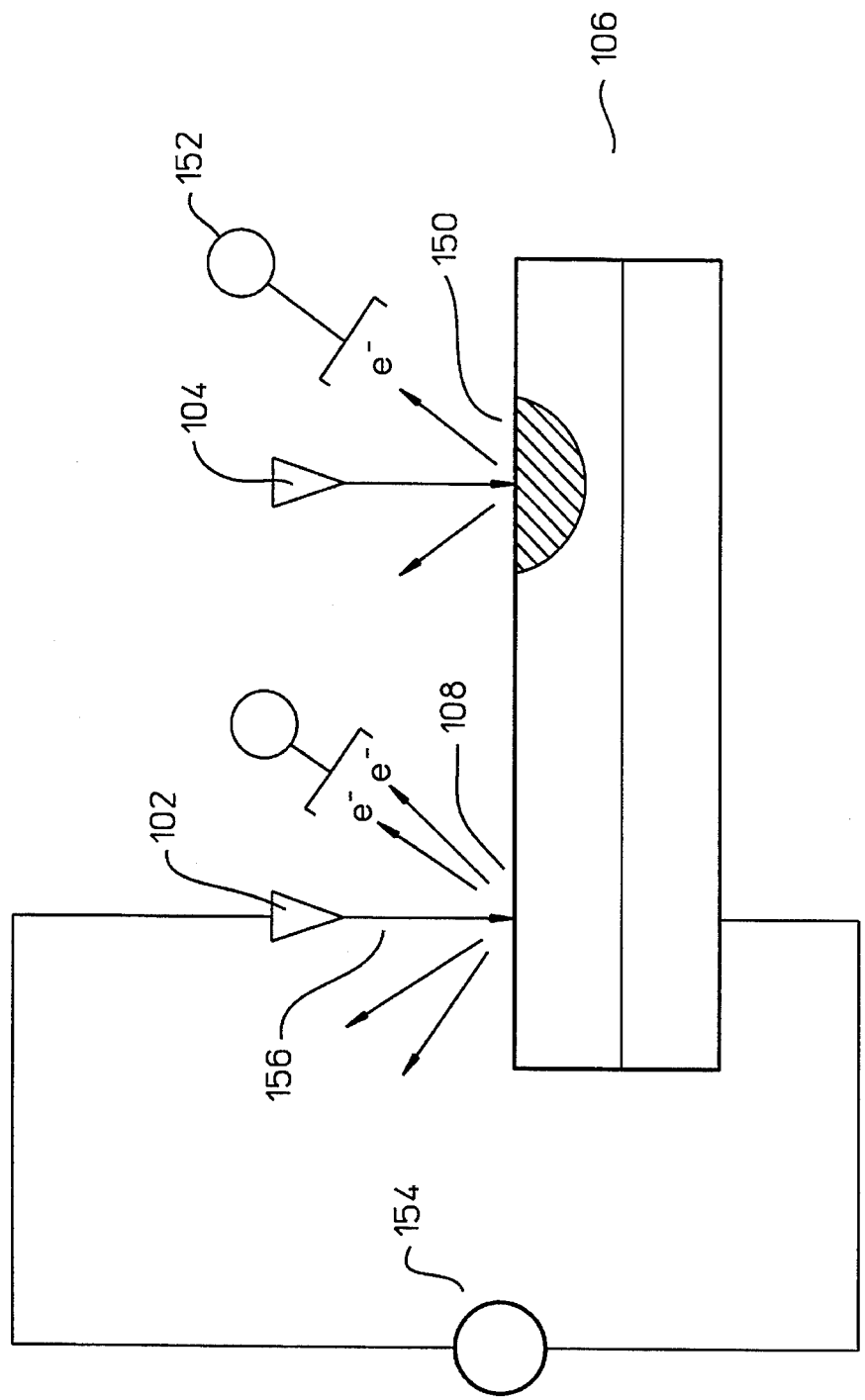
FIG. 2 shows the field emitters reading from storage areas in one embodiment of the present invention.

FIG. 2 shows schematically the field emitters reading from the storage medium 106. The state of one storage area 150 has been altered, while the state of another storage area 108 has not. When electrons bombard a storage area, both secondary electrons and back-scattered electrons will be collected by the electron collectors, such as 152. An area that has been modified will produce a different number of secondary electrons and back-scattered electrons, as compared to an area that has not been modified; the difference may be more or may be less depending on the type of material and the type of modification. By monitoring the magnitude of the signal current collected by the electron collectors 152, one can identify the state of, and, in turn, the bit stored in the storage area.

Figure 3:
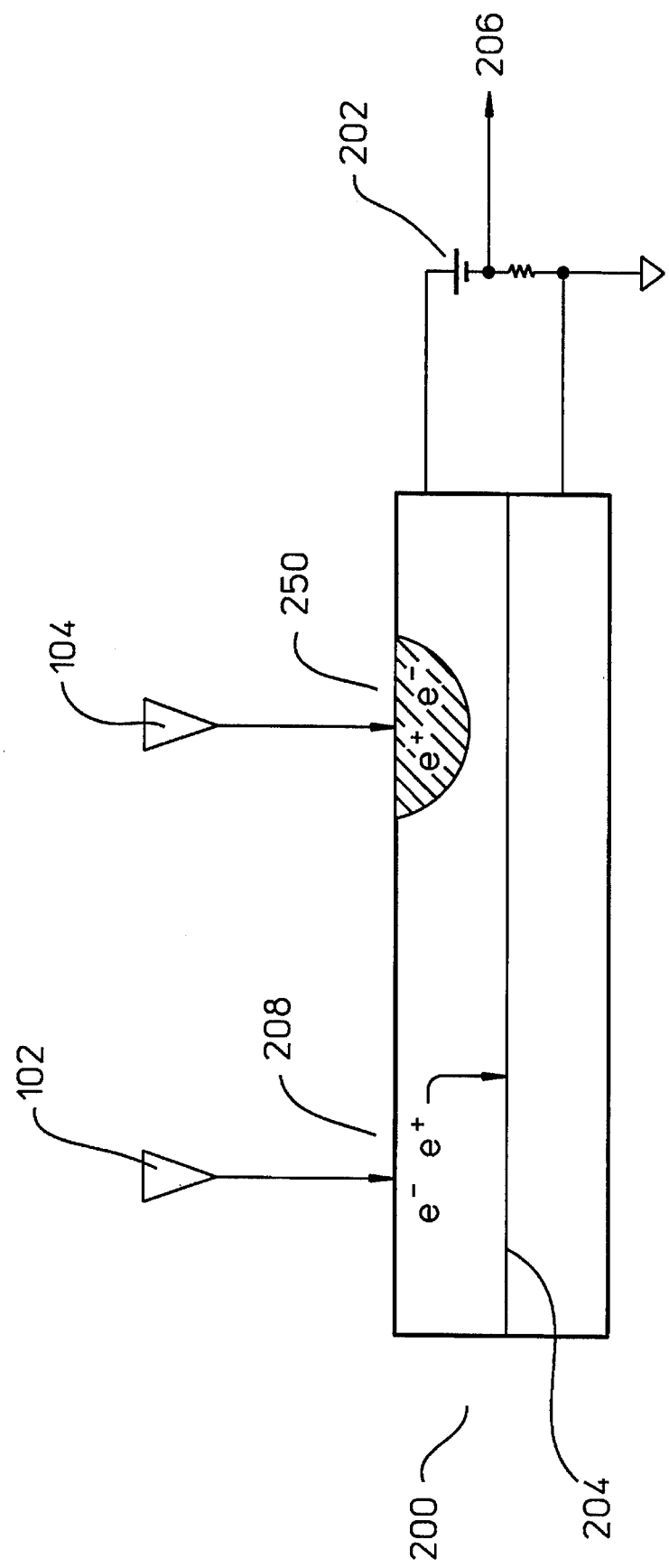
FIG. 3 shows the storage medium in the present invention based on a diode structure.

FIG. 3 shows another preferred embodiment, known in the present description as the preferred "Diode" approach. In this approach, the storage medium is based on a diode structure 200, which can be a pn junction or a Schottky barrier or any other type of "electronic valve". The basic idea is to store bits by locally altering the surface of a diode in such a way that the collection efficiency for minority carriers generated near the altered region is different from that of an unaltered region. The collection efficiency for minority carriers is defined as the fraction of minority carriers generated by the incident electrons that is swept across the diode junction 204 when it is biased by an external circuit 202, causing a signal current 206 to flow in the external circuit. The external circuit 202 shown just serves as an example of the concept. The actual external circuit may be different, but still provides a bias across the junction and measures the current across the junction.

In FIG. 3, field emitters 102 and 104 emit narrow beams of electrons onto the surface of the diode 200. The incident electrons excite electron-hole pairs near the surface of the diode. The diode is reversed-biased by an external circuit 202 so that the minority carriers that are generated by the incident electrons are swept toward the diode junction 204. Electrons that reach the pn junction 204 will be swept across the junction 204. In other words, minority carriers that do not recombine with majority carriers before reaching the junction are swept across the junction, causing a current to flow in the external biasing circuit 202.

Writing onto the diode 200 is accomplished by increasing the power density of the electron beam enough to locally alter some property of the diode. The alteration will affect the number of minority carriers swept across the junction 204 when the same area is irradiated with a lower power density "read" electron beam. For example, the recombination rate in a written area 250 could be increased relative to an unwritten area 208 so that the minority carriers generated in the written area have an increased probability of recombining with majority carriers before they have a chance to reach and cross the junction 204. Hence, a smaller current flows in the external circuit 202 when the read electron beam is incident upon a written area than when it is incident upon an unwritten area. Conversely, it is also possible to start with a diode structure with a high recombination rate, and to write bits by locally reducing the recombination rate. The magnitude of the current resulting from the minority carriers depends on the state of the storage area; and the current constitutes the output signal 206 to indicate the bit stored.

Figure 4A:
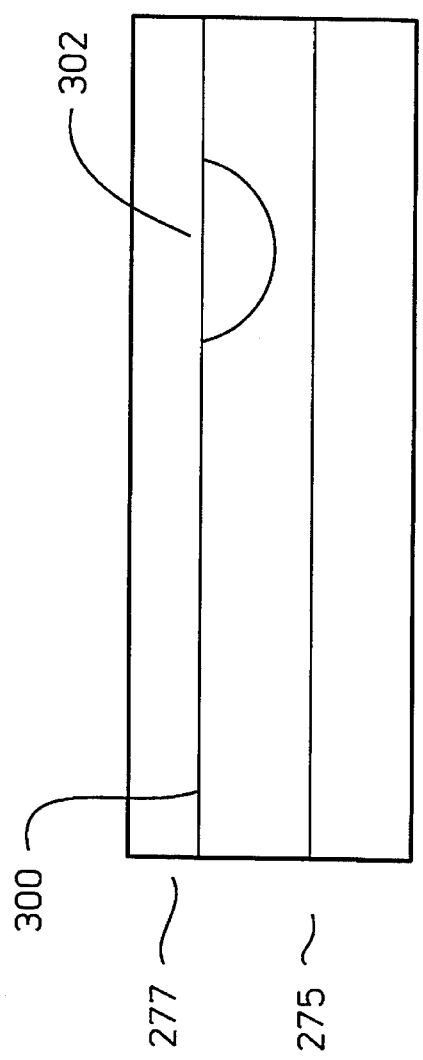
FIGS. 4A–4B show different preferred diode structures as storage media in the present invention.
Figure 4B:
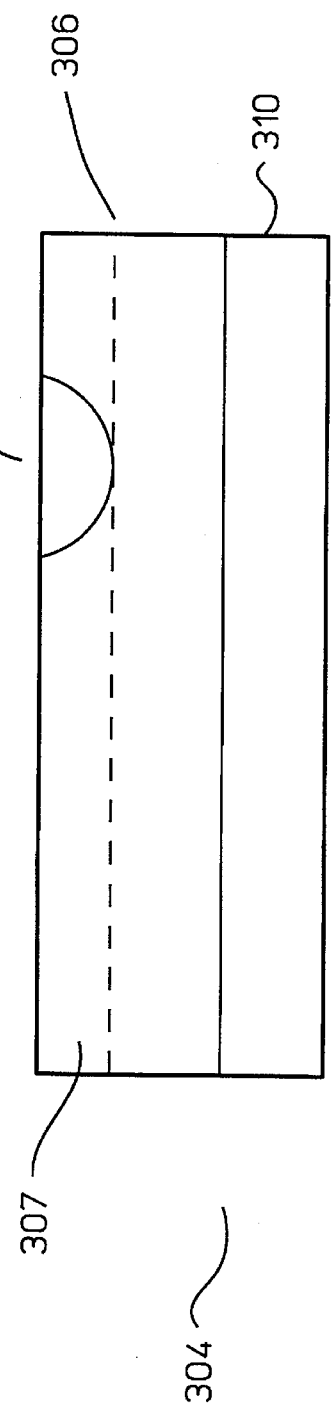

FIGS. 4A–B show different preferred diode structures as storage media in the present invention. FIG. 4A shows a diode 275 with a "poor" oxide layer 277 on top of it. "Poor" here means the interface or boundary 300 between the oxide 277 and the diode 275 has a high surface recombination rate. One example of such a diode is a silicon pn junction with a poor thermal oxide on its top surface. The interface 300 can be passivated with hydrogen to reduce its surface recombination rate. Electron beams may be used to heat up an area 302 of the hydrogenated interface to increase the recombination rate by either driving away the hydrogen or introducing defects. Methods to passivate recombination sites at a silicon/thermal oxide interface by hydrogenation are known in the art and will not be further described here.

FIG. 4B shows a pn junction diode 304 with either the p or the n layer as the top layer 306. Either all or just the top surface 307 of the top layer consists of hydrogenated amorphous silicon that is doped to be consistent with the doping of the rest of the top layer 306, which consists of crystalline silicon. The surface of the hydrogenated amorphous silicon layer 306 can be easily damaged by bombarding it with an electron beam. Such damage in a storage area 308 can introduce defects in the hydrogenated amorphous silicon layer that act as recombination sites increasing the recombination rate. The damage can be reversible by heating. Thus, one can have a bulk erase by resistively heating the entire storage medium. The building of such a diode can be found in "Electron-Beam-Induced Information Storage in Hydrogenated Amorphous Silicon Devices," by Yacobi, published in J. of Appl. Phys. Lett. 44, page 695, in 1984, and will not be further described here.

FIG. 4B can also be used to show another preferred diode structure, with the layer 306 being a phase-change material, such as a layer of germanium telluride, GeTe, which can be reversibly changed from a semiconducting (amorphous) to a metallic (crystalline) state by heating and cooling it at the proper rate. Thus, for example, if the GeTe is doped so that it is p-type when in its semiconducting state and is deposited on top of a n-type semiconductor layer 310, then a large contrast will be seen in the number of carriers swept across the junction if the GeTe is changed to its metallic state at the storage area 308.

Figure 5:
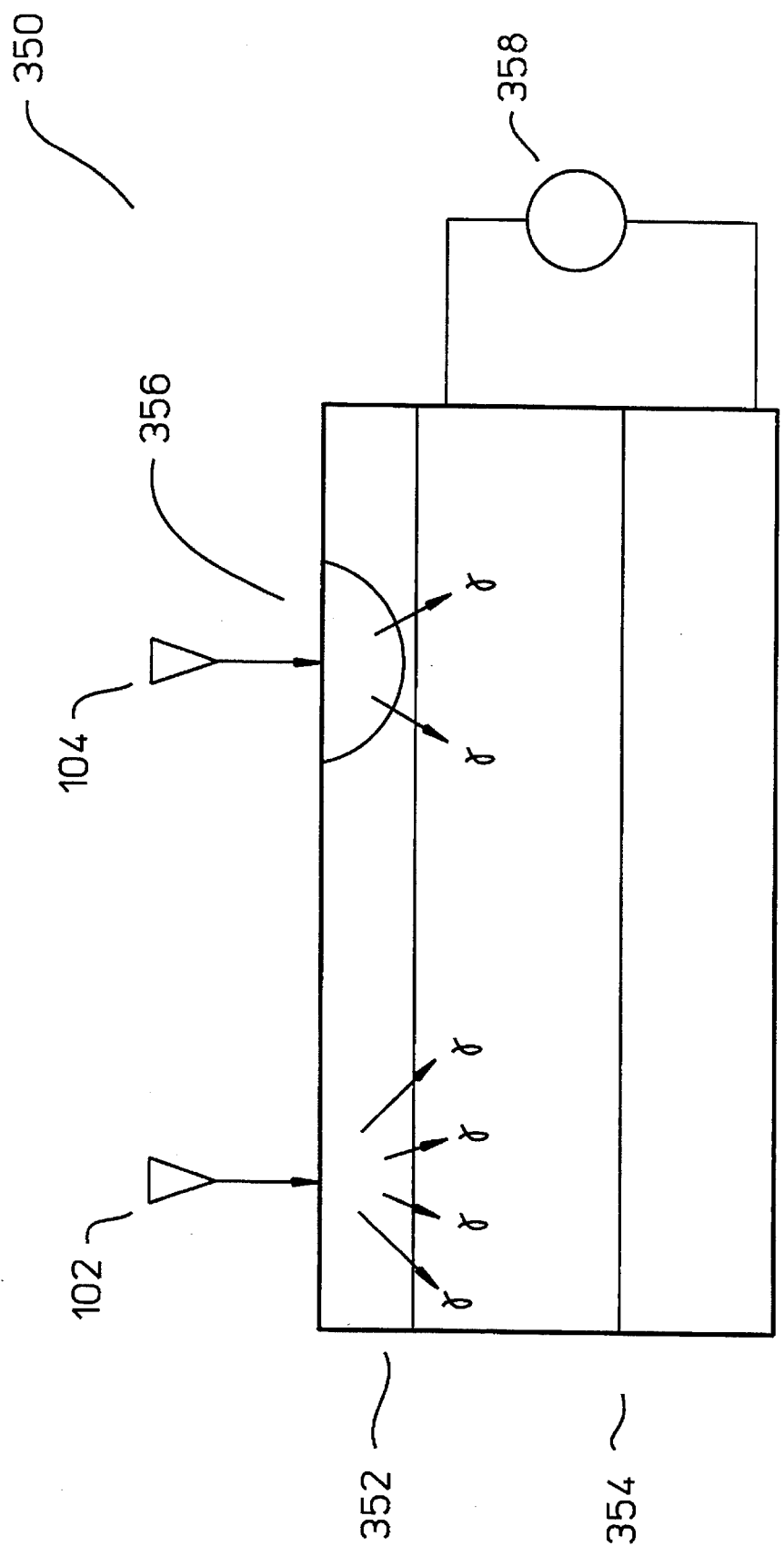
FIG. 5 shows the storage medium in the present invention based on a florescent material.

FIG. 5 shows another preferred embodiment 350 with a florescent layer 352 on a photodiode 354. Information is stored by using the field emitters to locally alter the light emitting properties of the florescent layer. The alteration changes the number of photons emitted by the florescent layer 352 and received by the photodiode 354 for each incident electron. Such changes can be carried out by striking a storage area 356 with an electron beam current with high enough power density to heat the storage area 356 to a high temperature. Most florescent materials are easily damaged by such heating. This damage increases the relative number of non-radiative recombination centers to radiative recombination centers so that the number of photons emitted by the florescent material for each incident electron is reduced. Alternatively, high energy electrons can be used to similarly alter the florescent material. In the read mode, an electron beam current with a lower power density is used to ensure that no further writing occurs. A meter 358 measures the current across the photodiode, which depends on the number of photons received by the photodiode and provides indication as to whether the storage area is altered or not. One possible example for the florescent layer is zinc oxide. The methods to build a florescent layer onto a photodiode should be known in the art and will not be further described here.

Note that field emitters may be noisy with the magnitude of the electron beam current varying with respect to time. Moreover, the gap distances between the tips of the emitters and the surface of the storage medium may vary. If the information stored in this invention were based on tunnelling current, then the gap distances would be extremely crucial. However, the present invention depends on field emitters, and the present invention does not directly measure the emitted electron beam current, but the effect of the beam. Moreover, at least two ways may be used to alleviate the problem of the emitters being noisy. One way is to connect a constant current source 154, as shown in FIG. 2, to the field emitter 102. This source will control the power density of the electron beam current 156. Although this method would not help storage techniques using the magnitude of the field-emitted current as the signal, in the present invention, this method reduces the field emitter noise significantly. Another way to alleviate field-emitter noise is to separately measure the emitted electron beam current and use it to normalize the signal current. As the electron beam current varies, the signal current varies correspondingly; on the other hand, the normalized signal current remains the same to indicate the state of the storage area.

The present invention allows electron beams to read and write at a larger distance across the storage medium than those in the prior art, while still maintaining a sufficiently small information bit size. This small bit size is possible because field emitters can emit very narrow electron beams. Also, as compared to numerous prior art approaches, the present invention not only allows for a relatively large gap between the field-emitters and the storage medium, the present invention is also relatively insensitive to the size of the gap.

Another advantage of the present invention is that it makes use of the massive parallelism that is possible through a large array of field emitters and through the micromover. This in turn allows for fast access times and high data rates.

Also advances in semiconductor microfabrication technology have reduced the manufacturing cost of the present invention. The micromover used to move the field emitters relative to the storage medium, as well as the field emitters themselves and the storage medium, can be relatively inexpensively mass-produced through silicon semiconductor microfabrication techniques. In fact, it is even possible that the field emitters, electron collectors, the storage medium and the micromover could all be microfabricated in the same process sequence, which would allow the device to be even more inexpensively manufactured.

Note that it is possible for the storage medium to provide some amplification of the signal current. Amplification is possible in the preferred "SEM" approach, because for some materials the SEEC is much larger than unity. Also, the preferred "Diode" approach can provide some amplification of the signal in the storage medium. This amplification is possible because the number of electron-hole pairs created in a semiconductor by an incoming electron is approximately equal to the energy of the incoming electron divided by three times the semiconductor's bandgap. For example, 100 eV electrons produce approximately 28 electron-hole pairs in Si, so the maximum possible gain is 28 for the diode approach if 100 eV electrons and a top layer of Si are used. Similarly, for the approach using a florescent layer, the electron-hole pairs created in that layer by the incident electrons give off photons when they recombine; again, the signal current can be larger than the incident electron beam current if multiple electron-hole pairs are created for each incident electron.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A storage device comprising:
    a field emitter made by semiconductor microfabrication techniques to generate an electron beam current; and a storage medium in close proximity to the field emitter, the storage medium having a storage area for storage, the storage area being in one of a plurality of states to represent the information stored in that storage area;

such that:

an effect is generated when the electron beam current bombards the storage area;

the magnitude of the effect depends on the state of the storage area; and the information stored in the storage area is read by measuring the magnitude of the effect.

2. A storage device as recited in claim 1 wherein the effect is a signal current.

3. A storage device as recited in claim 1 wherein the field emitter is preferably a point-emitter.

4. A storage device as recited in claim 2 wherein:

the signal current is normalized with respect to the magnitude of the electron beam current; and the normalized signal current indicates the state of the storage area;

such that even if the magnitude of the electron beam current varies, the normalized current does not vary correspondingly.

5. A storage device as recited in claim 2 further comprising:

a constant current source connected to the field emitter to control the magnitude of the electron beam current.

6. A storage device as recited in claim 1 further comprising a plurality of storage areas on the storage medium, with each storage area being similar to the storage area recited in claim 1.

7. A storage device as recited in claim 6 further comprising a deflector adjacent to the emitter to control the direction of the beam current to address a different storage area.

8. A storage device as recited in claim 1 further comprising:

a plurality of field emitters, each being similar to the field emitter recited in claim 1; and a plurality of storage areas on the storage medium, each storage area being similar to the storage area recited in claim 1;

such that a plurality of the field emitters can work in parallel to read information from the device.

9. A storage device as recited in claim 8 further comprising a microfabricated mover in the storage device to change the relative positions between the field emitters and the storage areas so that different storage areas can be bombarded by electron beam currents.

10. A storage device as recited in claim 1 further comprising:

a plurality of storage areas on the storage medium, with each storage area being similar to the one recited in claim 1; and a microfabricated mover in the storage device to position different storage areas to be bombarded by the electron beam current.

11. A storage device as recited in claim 10 further comprising:

a plurality of field emitters, with each emitter being similar to the one recited in claim 10, the plurality of field emitters being spaced apart, with each emitter being responsible for a number of storage areas on the storage medium;

such that a plurality of the field emitters can work in parallel to increase the data rate of the storage device.

12. A storage device as recited in claim 1 wherein the magnitude of the electron beam current is increased to a pre-selected level to change the state of the storage area, and to write information on the storage area.

13. A storage device as recited in claim 12 wherein:

the storage medium is made of a phase-change material; such that:

one state of the storage area is crystalline;

another state of the storage area is amorphous; and the storage area can be changed from one state to another by controlling the magnitude of the power density of the electron beam current bombarding the storage area.

14. A storage device as recited in claim 12 wherein:

the storage medium includes a florescent layer on a photodiode; and different states of the storage area are attained by changing the light emitting properties of the florescent layer.

15. A storage device as recited in claim 12 wherein:

the storage medium includes a diode;

such that different states of the storage area have different recombination rates.

16. A storage device as recited in claim 15 wherein:

the storage medium further includes an oxide layer on the diode;

the boundary between the oxide layer and the diode is hydrogenated to reduce the recombination rate at the boundary; and different recombination rates are introduced by bombarding the boundary with the electron beam current.

17. A storage device as recited in claim 15 wherein:

the diode includes a p layer and a n layer, with one of the two layers being the top layer;

at least the top surface of the top layer is a hydrogenated-amorphous silicon layer; and different recombination rates are introduced by bombarding the silicon layer with the electron beam current.

18. A storage device as recited in claim 15 wherein:

the diode includes a p layer and a n layer, with one of the two layers being the top layer;

the top layer is a made of a phase-change material; and different recombination rates are introduced by bombarding the top layer with the electron beam current.

19. A storage device as recited in claim 18 wherein the phases of the phase-change material include a metallic phase and a semiconductor phase.

20. A storage device as recited in claim 12 wherein the storage medium includes a diode.

21. A storage device as recited in claim 20 wherein the diode is a schottky diode.

22. A storage device as recited in claim 20 wherein the diode includes a player and an layer.

23. A storage device as recited in claim 1 further comprising an electrode to raster the electron beam current over the storage medium.

24. A storage device as recited in claim 23 wherein the electron beam current is rastered electrostatically.

25. A storage device as recited in claim 23 wherein the electron beam current is rastered electromagnetically.

* * * * *